United States Patent
Guinard et al.

(10) Patent No.: US 12,346,428 B2
(45) Date of Patent: Jul. 1, 2025

(54) TWO-FACTOR ARTIFICIAL-INTELLIGENCE-BASED AUTHENTICATION

(71) Applicant: EVRYTHNG Ltd, London (GB)

(72) Inventors: Dominique Guinard, Yverdon-les-Bains (CH); Shmuel Silverman, Novato, CA (US)

(73) Assignee: Evrythng Ltd., London (GB)

( * ) Notice: Subject to any disclaimer, the term of this patent is extended or adjusted under 35 U.S.C. 154(b) by 923 days.

(21) Appl. No.: 17/173,208

(22) Filed: Feb. 10, 2021

(65) Prior Publication Data

US 2021/0256110 A1 Aug. 19, 2021

Related U.S. Application Data

(60) Provisional application No. 62/976,477, filed on Feb. 14, 2020.

(51) Int. Cl.
| | | |
|---|---|---|
| *G06Q 10/08* | (2024.01) | |
| *G06F 21/45* | (2013.01) | |
| *G06N 3/08* | (2023.01) | |
| *G06T 7/73* | (2017.01) | |

(52) U.S. Cl.
CPC .............. *G06F 21/45* (2013.01); *G06N 3/08* (2013.01); *G06Q 10/08* (2013.01); *G06T 7/74* (2017.01); *G06T 2207/20081* (2013.01)

(58) Field of Classification Search
CPC .. G06F 21/45; G06T 7/74; G06N 3/08; G06Q 10/08
USPC .......................................................... 235/437
See application file for complete search history.

(56) References Cited

U.S. PATENT DOCUMENTS

| | | | |
|---|---|---|---|
| 7,599,544 B2 | 10/2009 | Moshe | |
| 8,556,732 B2* | 10/2013 | Raichman | A63H 33/38 463/43 |
| 8,908,920 B2 | 12/2014 | Wood et al. | |
| 9,576,221 B2* | 2/2017 | Mayle | G06V 10/462 |
| 9,582,595 B2 | 2/2017 | Trifa | |
| 9,794,321 B2 | 10/2017 | Trifa | |
| 10,015,354 B2 | 7/2018 | Hill | |
| 10,140,492 B1 | 11/2018 | Nair | |

(Continued)

FOREIGN PATENT DOCUMENTS

| | | |
|---|---|---|
| CN | 109697481 A | 4/2019 |
| WO | 2023096924 | 6/2023 |

*Primary Examiner* — Michael G Lee
*Assistant Examiner* — David Tardif
(74) *Attorney, Agent, or Firm* — Klarquist Sparkman, LLP

(57) ABSTRACT

A computer device may receive multiple images of instances of a label and timestamps or identifiers of the images, where the instances of the label are associated with a printer. Then, the computer may divide the images into subgroups based at least in part on the timestamps or the identifiers and/or differences between the images, and may train a predictive model using the subgroups and information specifying the printer. For a given subgroup, the predictive model may be associated with a predictive signature. Moreover, the predictive model may have a given image of a given instance of the label as an input, and may provide an identity or an identifier of the given subgroup associated with the given image and the printer as an output. Note that the predictive model may be used to activate and/or authenticate another instance of the label.

20 Claims, 11 Drawing Sheets

(56) References Cited

U.S. PATENT DOCUMENTS

| | | | |
|---|---|---|---|
| 10,872,265 B2 | 12/2020 | Ross | |
| 11,068,761 B2 | 7/2021 | Guinard | |
| 11,164,149 B1* | 11/2021 | Williams | G06K 19/06028 |
| 11,720,774 B2 | 8/2023 | Guinard | |
| 2017/0032285 A1* | 2/2017 | Sharma | G06N 20/00 |
| 2017/0286735 A1 | 10/2017 | Lazzouni et al. | |
| 2017/0351993 A1* | 12/2017 | Vengalathur Srinath | G09F 3/00 |
| 2018/0349695 A1 | 12/2018 | Le Henaff | |
| 2019/0149725 A1* | 5/2019 | Adato | H04N 1/00 348/158 |
| 2019/0236531 A1* | 8/2019 | Adato | G06V 20/64 |
| 2020/0193252 A1* | 6/2020 | Guinard | G06K 19/145 |
| 2020/0226405 A1 | 7/2020 | Huber, Jr. | |
| 2020/0394441 A1 | 12/2020 | Wen | |
| 2020/0412912 A1* | 12/2020 | Maeda | H04N 1/603 |
| 2021/0142337 A1 | 5/2021 | Guinard | |
| 2021/0256110 A1 | 8/2021 | Dominique | |
| 2021/0295125 A1 | 9/2021 | Guinard | |
| 2022/0123939 A1 | 4/2022 | Guinard | |
| 2022/0156753 A1 | 5/2022 | Guinard | |
| 2022/0158996 A1 | 5/2022 | Guinard | |
| 2022/0158997 A1 | 5/2022 | Guinard | |
| 2023/0086113 A1 | 3/2023 | Guinard | |

* cited by examiner

```
                                    ┌─ 200

┌─────────────────────────┐
        │   PROVIDE INSTUCTIONS   │
        │           210           │
        └───────────┬─────────────┘
                    ▼
        ┌─────────────────────────┐
        │ ACQUIRE ONE OR MORE     │
        │        IMAGES           │
        │           212           │
        └───────────┬─────────────┘
                    ▼
        ┌─────────────────────────┐
        │ PROVIDE ONE OR MORE     │
        │ IMAGES, AND TIMESTAMPS  │
        │      OR IDENTIFIERS     │
        │           214           │
        └───────────┬─────────────┘
                    ▼
        ┌─────────────────────────┐
        │  PERFORM ONE OR MORE    │
        │  ADDITIONAL OPERATIONS  │
        │       (OPTIONAL)        │
        │           216           │
        └─────────────────────────┘
```

FIG. 2

TWO-FACTOR ARTIFICIAL-INTELLIGENCE-BASED AUTHENTICATION

CROSS REFERENCE TO RELATED APPLICATIONS

This application claims priority under 35 U.S.C. 119(e) to U.S. Provisional Application Ser. No. 62/976,477, entitled "Two-Factor Artificial-Intelligence-Based Authentication," by Dominique Guinard, et al., filed on Feb. 14, 2020, the contents of both of which are herein incorporated by reference.

BACKGROUND

Field

The described embodiments relate to identification and/or authentication. Notably, the described embodiments relate techniques that facilitate multi-factor identification and/or authentication of a labels.

Related Art

Currently, product identifiers for consumer packaged goods (CPG), fresh food, apparel and pharmaceutical products usually take the form of a code that is scannable. For example, a product identifier may include a two-dimensional code with visual elements that encodes information needed to identify the product. The typical use case is to print these product identifiers directly on a product or to use a label that is printed and attached to the product.

Sometimes, a goods manufacturing facility may print tags and produce goods outside the limits required by the company that owns the goods (or the label). These extra items are often sold as originals without the knowledge or control of the product owners and without any compensation to the owners.

Some existing approaches attempt to solve this problem by making sure that, when a tag is scanned, the good be identified as legitimate or not. However, because the good manufacturing is at the same facility as the originals, it can be difficult to know if a particular product is original or not.

SUMMARY

In a first group of embodiments, an electronic device that performs product identification and authentication is described. This electronic device may include: an interface circuit that communicates with a computer (which may be remotely located from the electronic device); a processor; and memory that stores program instructions. During operation, the electronic device may provide instructions for a label to a printer to print instances of a label. Then, the electronic device may acquire one or more images of one or more instances of the label using an image sensor (such as a scanner), where a given image has a larger field of view than one that encompasses only the text or content in a given instance of the label. Next, the electronic device may provide, from the interface circuit, the one or more images and one or more timestamps or identifiers of the one or more images to the computer.

Subsequently, the electronic device may acquire another image of another instance of the label. Then, the electronic device may provide, from the interface circuit and to the computer, the other image and a unique identifier that specifies another subgroup of images that includes the other image and the printer that generated the other instance of the label. Next, the electronic device may receive, at the interface circuit, information from the computer that indicates whether the other instance of the label is authentic.

Note that the instructions for the label may be: received from another electronic device using the interface circuit; accessed in the memory; or generated by the electronic device. For example, the instructions for the label may be received from the other electronic device based at least in part on a request from the electronic device and a valid authentication of the request.

Moreover, the electronic device may include the printer and/or the image sensor.

Furthermore, when there are multiple images of the one or more instances of the label, the electronic device may use the multiple images to correct an imaging error in the multiple images of the one or more instances of the label.

Additionally, the electronic device may extract information from the other image, including: a location where the other image was acquired, a time when the other image was acquired, an environment where the other image was acquired, a temperature when the other image was acquired, a quality of the image sensor that acquired the other image, and/or a distance between the image sensor and the other instance of the label when the other image was acquired. The electronic device may provide the extracted information to the computer.

Note that the computer may provide information to the electronic device that indicates that the label is activated. Notably, the label may be factory activated. For example, given an identity associated with a given label, a camera or mage sensor may scan the identity and may provide the corresponding information to a cloud-based system to activate a digital portion of the identity. This activation may be used to combat counterfeits and/or backdoor goods.

Another embodiment provides the other electronic device.

Another embodiment provides a computer-readable storage medium for use with the electronic device. When executed by the computer, this computer-readable storage medium causes the electronic device to perform at least some of the aforementioned operations.

Another embodiment provides a method, which may be performed by the electronic device. This method includes at least some of the aforementioned operations.

In a second group of embodiments, an electronic device that performs product identification and authentication is described. This electronic device may include: an interface circuit that communicates with a computer (which may be remotely located from the electronic device); a processor; and memory that stores program instructions. During operation, the electronic device may acquire an image of an instance of a label. Then, the electronic device may provide, from the interface circuit and to the computer, the image and a unique identifier that specifies a subgroup of images that includes the image and a printer that generated the instance of the label. Next, the electronic device may receive, at the interface circuit, information from the computer that indicates whether the instance of the label is authentic.

Moreover, the electronic device may extract information from the image, including: a location where the image was acquired, a time when the image was acquired, an environment where the image was acquired, a temperature when the image was acquired, a quality of an image sensor that acquired the image, and/or a distance between the image sensor and the instance of the label when the image was acquired. The electronic device may provide the extracted information to the computer.

Another embodiment provides a computer-readable storage medium for use with the electronic device. When executed by the computer, this computer-readable storage medium causes the electronic device to perform at least some of the aforementioned operations.

Another embodiment provides a method, which may be performed by the electronic device. This method includes at least some of the aforementioned operations.

In a third group of embodiments, a computer that trains a predictive model is described. This computer may include: an interface circuit that communicates with an electronic device (which may be remotely located from the computer); a processor; and memory that stores program instructions. During operation, the computer may receive, at the interface circuit, multiple images of instances of a label and timestamps or identifiers of the images, where the instances of the label are associated with a printer that generated the instances of the label. Then, the computer may divide the images into subgroups (or batches) based at least in part on the timestamps or the identifiers and/or differences between the images, and may train the predictive model using the subgroups and information specifying the printer, where, for a given subgroup, the predictive model is associated with a predictive signature, and where the predictive model has a given image of a given instance of the label as an input, and provides an identity or an identifier of the given subgroup associated with the given image and the printer as an output.

Subsequently, the computer may receive, at the interface circuit and from the electronic device or a second electronic device, another image of another instance of the label and a unique identifier that specifies another subgroup of images that includes the other image and the printer that generated the other instance of the label. Using the unique identifier and the pretrained predictive model, the computer may determine whether the other image is associated with the other subgroup of the images and the printer. Next, the computer may selectively provide, from the interface circuit and to the electronic device or the second electronic device, information confirming that the other instance of the label is authentic when the other image is associated with the other subgroup of the images and the printer. Otherwise, the computer may perform a remedial action when the other image is not associated with the other subgroup of the images and the printer.

In some embodiments, the other subgroup may be one of the subgroups. Alternatively, the other subgroup may be different from the subgroups and the computer may predict the other subgroup based at least in part on changes between the subgroups.

Moreover, the determination may be based at least in part on: a previous image of the other instance of the label, a location associated with the previous image, a promotion in a region, and/or a product launch in a second region.

Note that the predictive signatures for at least some of the subgroups may be different.

Moreover, the predictive model may be trained using a machine-learning technique, such as a supervised-learning technique. In some embodiments, the predictive model may include a neural network.

Furthermore, in some embodiments, the predictive model includes multiple predictive models, where a given predictive model is associated with a given subgroup and a given predictive signature. For example, the given predictive signature may be associated with printer noise corresponding to the printer.

Additionally, the computer may not be able to uniquely identify the given subgroup associated with the given image. For example, the computer identify that the given image is associated with one of the subgroups, but does not uniquely identify the given subgroup.

Moreover, the label may be a product label.

In some embodiments, the computer may extract information from the other image, including: a location where the other image was acquired, a time when the other image was acquired, an environment where the other image was acquired, a temperature when the other image was acquired, a quality of an image sensor that acquired the other image, and/or a distance between the image sensor and the other instance of the label when the other image was acquired. Alternatively, the computer may receive, at the interface circuit, the extracted information from the electronic device or the second electronic device. The computer may use the extracted information to authenticate the other instance of the label. For example, the computer may compare the extracted information to stored information in the memory. Moreover, the determination may be based at least in part on the extracted information. For example, the determination may include: comparing the extracted information to stored information; and/or using the extracted information as an input to the predictive model.

Furthermore, the computer may receive, at the interface circuit and from the second electronic device, a request to activate the other instance of the label, where the request may include the other image of the other instance of label and the unique identifier that specifies the other subgroup of images that includes the other image and the printer that generated the other instance of the label. Then, the computer may authenticate the other instance of the label using the predictive model, where the other instance of the label may be authenticated based at least in part on the other subgroup of the images, the unique identifier and the outputs of the predictive model. For example, the computer may compare the other subgroup of the images, the unique identifier and the outputs of the predictive model. Moreover, the computer may selectively activate the other instance of the label based at least in part on the authentication. Next, the computer may selectively provide, to the interface circuit and to the second electronic device, information that indicates that the other instance of the label is activated based at least in part on the selective activation. Otherwise, the computer may provide, to the interface circuit and to the second electronic device, information that indicates that the other instance of the label is not activated.

Additionally, the predictive model may be based at least in part on information that specifies one or more conditions for which the instances of the label are valid. For example, the one or more conditions may include: one or more products, one or more product types, one or more attributes of the one or more products, one or more locations or regions where the instances of the label are valid, one or more time intervals during which the instances of the label are valid, and/or metadata associated with the one or more products.

Another embodiment provides a computer-readable storage medium for use with the computer. When executed by the computer, this computer-readable storage medium causes the computer to perform at least some of the aforementioned operations.

Another embodiment provides a method, which may be performed by the computer. This method includes at least some of the aforementioned operations.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

FIG. 2 is a flow diagram illustrating an example of a method for providing images of instances of a label using an electronic device of FIG. 1 in accordance with an embodiment of the present disclosure.

Note that like reference numerals refer to corresponding parts throughout the drawings. Moreover, multiple instances of the same part are designated by a common prefix separated from an instance number by a dash.

DETAILED DESCRIPTION

Figure 1:
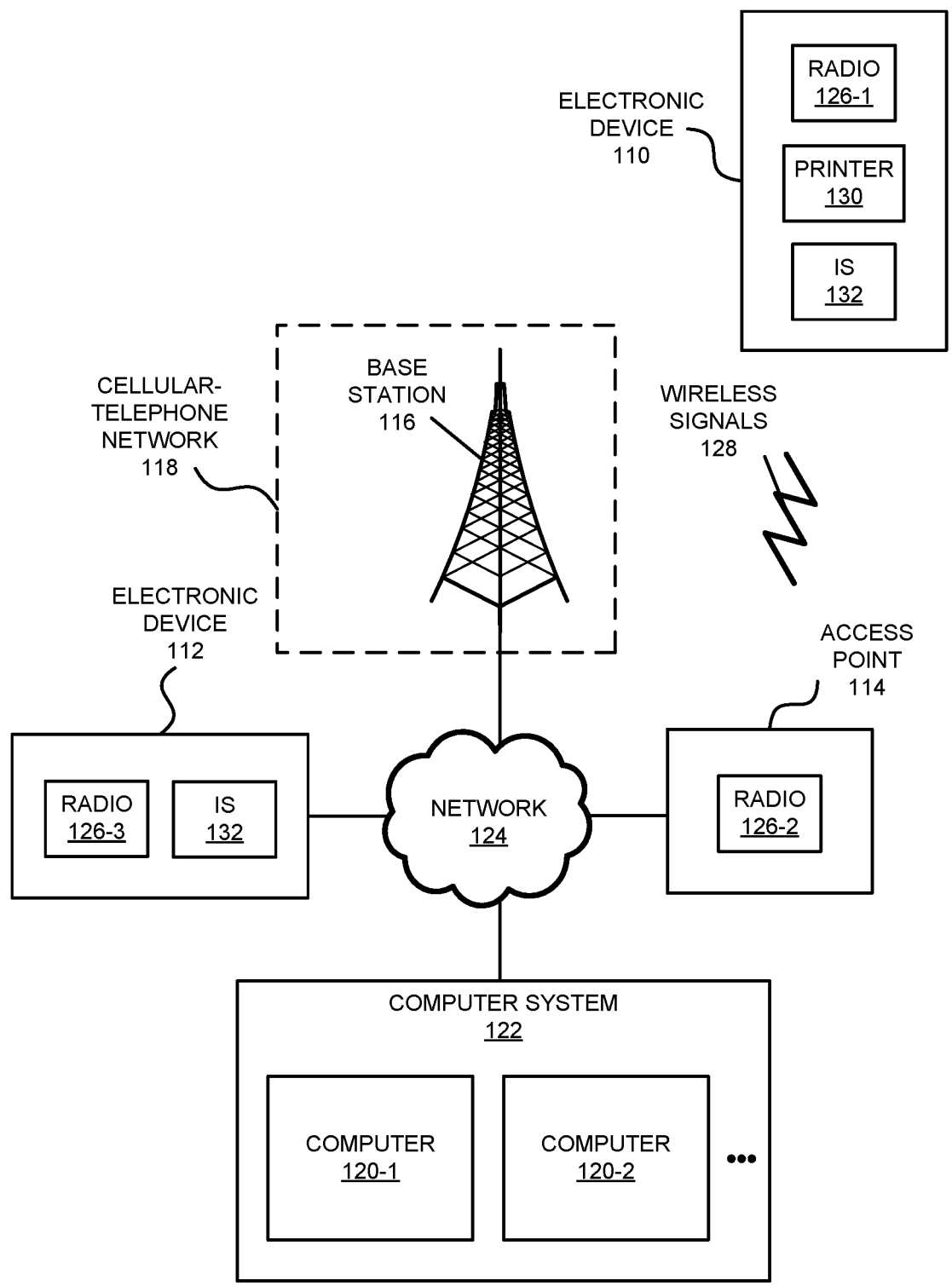
FIG. 1 is a block diagram illustrating an example of communication among electronic devices in accordance with an embodiment of the present disclosure.

In a first group of embodiments, an electronic device that provides images of instances of a label is described. During operation, the electronic device may provide instructions for a label to a printer to print instances of a label. Then, the electronic device may acquire one or more images of one or more instances of the label using an image sensor (such as a scanner), where a given image has a larger field of view than one that encompasses only the text or content in a given instance of the label. Next, the electronic device may provide, to a computer, the one or more images and one or more timestamps or identifiers of the one or more images.

The computer may use this information to train a predictive model, which may be used (or remotely accessed) by the electronic device to authenticate another image of another instance of the label. For example, in a second group of embodiments, an electronic device that authenticates an instance of a label is described. During operation, the electronic device may acquire an image of an instance of a label. Then, the electronic device may provide, to the computer, the image and a unique identifier that specifies a subgroup of images that includes the image and a printer that generated the instance of the label. Next, the electronic device may receive information from the computer that indicates whether the instance of the label is authentic.

In a third group of embodiments, a computer device that trains a predictive model is described. During operation, the computer may receive multiple images of instances of a label and timestamps or identifiers of the images, where the instances of the label are associated with a printer that generated the instances of the label. Then, the computer may divide the images into subgroups (or batches) based at least in part on the timestamps or the identifiers and/or differences between the images, and may train the predictive model using the subgroups and information specifying the printer. For a given subgroup, the predictive model may be associated with a predictive signature. Moreover, the predictive model may have a given image of a given instance of the label as an input, and may provide an identity or an identifier of the given subgroup associated with the given image and the printer as an output. Note that the predictive model may be used to activate and/or authenticate another instance of the label.

By facilitating authentication of instances of the label, this label-management technique may facilitate controlled use of the instances of the label. For example, the label may be a product label, and the label-management technique may be used to reduce or eliminate inadvertent or malicious duplication of instances of the label. In turn, this capability may reduce or eliminate fraudulent products and/or unauthorized distribution of the products. Thus, the label-management technique may authenticate a label, and associated the label to a specific printer and to a time window or batch that the label belongs to and for which the label is activated. In addition, the label-management technique may allow environmental changes to influence the signature of a printer on the label. This dynamic activation and labeling may allow groups of labels to be associated with a unique printer signature that depicts, e.g., random printer and environmental events that are unique to the printer, and to use the group of labels to address product authenticity problems. Consequently, the label-management technique may facilitate improved supply-chain management (e.g., by reducing confusion, errors and/or malicious actions, as well as the associated expenses) and consumer trust in products.

In some embodiments, the label-management technique may provide globally unique instances of labels in a distributed or decentralized manner, e.g., using distributed pretrained predictive models, which may be replicated, shared, synchronized and geographically spread across multiple sites, countries, and/or institutions. Because of this decentralized technology, trust in the instances of the label may be further enhanced. Furthermore, the decentralized technology may allow product metadata to be assigned or associated with the instances of the labels, which may allow general access to this information, e.g., via public blockchains. Additionally, the decentralized technology may provide resilience, because the instances of the labels and their associated metadata may be stored or maintained in a decentralized network that includes many nodes. Therefore, the label-management technique may facilitate an increase in commercial activity and may improve the user experience when using the instances of the label. However, in other embodiments, the label-management technique may be implemented in a centralized manner.

In the discussion that follows, electronic devices may communicate packets or frames with wired and/or wireless networks (e.g., via access points, radio nodes or base stations) in accordance with a wired communication protocol (such as an Institute of Electrical and Electronics Engineers or IEEE 802.3 standard, which is sometimes referred to as 'Ethernet', or another type of wired interface) and/or a wireless communication protocol, such as: an IEEE 802.11 standard (which is sometimes referred to as 'Wi-Fi,' from the Wi-Fi Alliance of Austin, Tex.), Bluetooth (from the Bluetooth Special Interest Group of Kirkland, Wash.), a cellular-telephone communication protocol (such as 2G, 3G, 4G, 5G, Long Term Evolution or LTE, another cellular-telephone communication protocol, etc.) and/or another type of wireless interface. In the discussion that follows, Wi-Fi, a cellular-telephone communication protocol and Ethernet are used as an illustrative example. However, a wide variety of communication protocols (such as) may be used. Note that the wireless communication may occur in a variety of frequency bands, such as: a cellular-telephone communication band, a frequency band associated with a Citizens Band Radio Service, a Wi-Fi frequency band (such as a 2.4 GHz, a 5 GHz and/or a 60 GHz frequency band), etc.

Moreover, in the discussion that follows, the instances of the label are associated with a product (e.g., a label may be a product label). However, in other embodiments, the label-management technique may be used in conjunction with a wide variety of labels in different applications. Thus, in some embodiments, a label may be other than a product label. In general, a label in the following discussion may be associated with (e.g., created or generated by) a printer, such as: a dot matrix printer, a laser printer, a thermal printer, an LED printer, an inkjet printer, a solid ink printer, a 3D printer, etc.

FIG. 1 presents a block diagram illustrating an example of communication among one or more of electronic devices 110 and 112 (such as a cellular telephone, a computer, etc., and which are sometimes referred to as 'clients'), access point 114, base station 116 in cellular-telephone network 118, and one or more computers 120 in computer system 122 in accordance with some embodiments. Access point 114 and base station 116 may communicate with computer system 122 via network 124 (such as the Internet) using wireless and/or wired communication (such as by using Ethernet or a communication protocol that is compatible with Ethernet), and may communicate with electronic device 110 using wireless communication (Wi-Fi and a cellular-telephone communication protocol, respectively). Note that access point 114 may include a physical access point and/or a virtual access point that is implemented in software in an environment of an electronic device or a computer. In addition, access point 114 and/or base station 116 may communicate with electronic devices 110 using wireless communication, while electronic device 112 may communicate with computer system 122 via network 124.

While not shown in FIG. 1, the wired and/or wireless communication with electronic devices 110 and/or 112 may further occur via an intra-net, a mesh network, point-to-point connections, etc., and may involve one or more routers and/or switches. Furthermore, the wireless communication may involve: transmitting advertising frames on wireless channels, detecting one another by scanning wireless channels, establishing connections (for example, by transmitting association or attach requests), and/or transmitting and receiving packets or frames (which may include the association requests and/or additional information as payloads). In some embodiments, the wired and/or wireless communication in FIG. 1 also involves the use of dedicated connections, such as via a peer-to-peer (P2P) communication technique.

Figure 11:
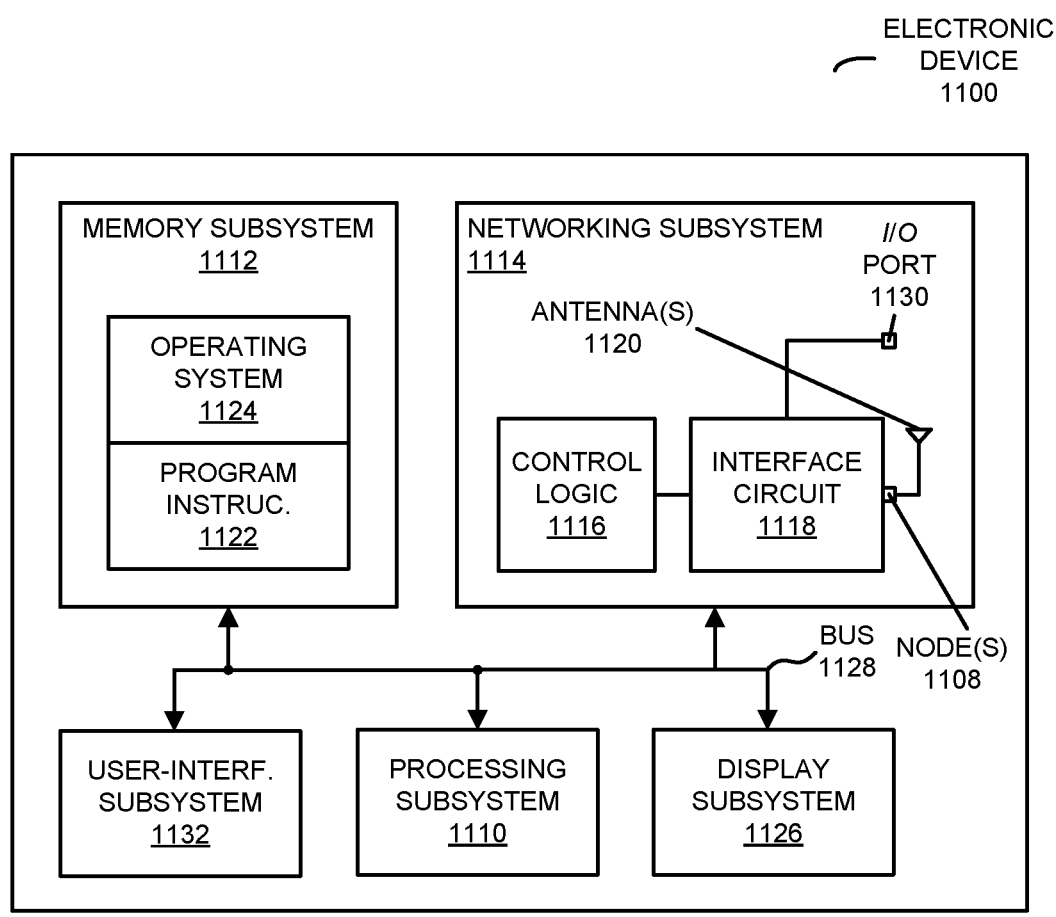
FIG. 11 is a block diagram illustrating an example of an electronic device in accordance with an embodiment of the present disclosure.

As described further below with reference to FIG. 11, electronic device 110, electronic device 112, access point 114, base station 116, and/or computers 120 may include subsystems, such as a networking subsystem, a memory subsystem and a processor subsystem. In addition, electronic device 110, access point 114 and base station 116 may include radios 126 in the networking subsystems. More generally, electronic device 110, electronic device 112 and access point 114 can include (or can be included within) any electronic devices with the networking subsystems that enable electronic device 110 and access point 114 to communicate with each other using wireless and/or wired communication. This wireless communication can comprise transmitting advertisements on wireless channels to enable access point 114 and/or electronic device 110 to make initial contact or detect each other, followed by exchanging subsequent data/management frames (such as association requests and responses) to establish a connection, configure security options (e.g., Internet Protocol Security), transmit and receive packets or frames via the connection, etc. Note that while instances of radios 126 are shown in electronic device 110 and access point 114, one or more of these instances may be different from the other instances of radios 126.

As can be seen in FIG. 1, wireless signals 128 (represented by a jagged line) are transmitted from radio 126-1 in electronic device 110. These wireless signals may be received by radio 126-2 in access point 114. Notably, electronic device 110 may transmit packets or frames. In turn, these packets or frames may be received by access point 114. Moreover, access point 114 may allow electronic device 110 to communicate with other electronic devices, computers and/or servers via network 124.

Note that the communication among components in FIG. 1 may be characterized by a variety of performance metrics, such as: a received signal strength (RSSI), a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

In the described embodiments processing a packet or frame in electronic device 110 and/or access point 114 includes: receiving signals (such as wireless signals 128) with the packet or frame; decoding/extracting the packet or frame from received wireless signals 128 to acquire the packet or frame; and processing the packet or frame to determine information contained in the packet or frame.

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

As discussed previously, it is often difficult to control the distribution or use of labels, such as product labels. Consequently, duplicate or fraudulent instances of labels occur. This results in confusion and theft, and undermines the trustworthiness of product labels and the associated products.

As described further below with reference to FIGS. 2-10, in order to address these problems, the label-management technique may be used to activate and authenticate product labels. Notably, as described further below with reference to FIGS. 2-3, an electronic device (such as electronic device 110) may include or may be coupled to a printer 130 (such as a printer in a factory). This printer may be used to print instances of a label. For example, computer system 122 (such as computer 120-1) may provide instructions for the label to electronic device 110. The instructions may be provided to electronic device 110 in response to a request from electronic device 110 to computer 120-1, after computer 120-1 has authenticated that the request is valid. Alternatively or additionally, electronic device 110 may access the instructions for the label in memory and/or may generate the instructions for the label.

Then, based at least in part on the instructions, electronic device 110 may instruct printer 130 to print one or more instances of the label. For example, printer 130 may print product labels or tags for use with one or more products or types of products.

Moreover, electronic device 110 may include or may be coupled to an image sensor (IS) 132 (such as a CMOS or a CCD sensor). For example, electronic device 110 may include or may be coupled to a camera or a scanner. Using image sensor 132, electronic device 110 may acquire one or more images of one or more instances of the label. Notably, electronic device 110 may instruct image sensor 132 to capture the one or more images. In some embodiments, one or more images of a given instance of the label may be acquired when printer 130 prints or generates the given instance of the label. Note that a given image may have a larger field of view than one that encompasses only the text or content in the given instance of the label. For example, the larger field of view may encompass a region in the label that surrounds the text or content in the label, so that background printer noise is included in the given image. As described further below, this additional perspective information may be used by computer system 122 to train a predictive model and/or to authenticate an instance of the label.

Next, electronic device 110 may provide, to computer system 122 (such as computer 120-1), the one or more images and one or more timestamps or identifiers of the one or more images. In some embodiments, electronic device 110 may provide additional information to computer system 122, such as information specifying printer 130, a location of printer 130 and/or image sensor 132, a time or a timestamp when a given image was acquired, an environment where the given image was acquired (such as in a home, a retail establishment, etc.), a temperature when the given image was acquired, a quality of image sensor 132 that acquired the given image, a distance between image sensor 132 and the instance of the label when the given image was acquired, etc. For example, the additional information may be extracted or inferred from the one or more images (such as by using an image-processing or image-analysis technique) and/or may be determined by printer 130 and/or electronic device 110. In some embodiments, the image-processing or image-analysis technique may include one or more of: an edge or a line-segment detector, a texture-based feature detector, a texture-less feature detector, a scale invariant feature transform (SIFT)-like object-detector, a speed-up robust-features (SURF) detector, a binary-descriptor (such as ORB) detector, a binary robust invariant scalable keypoints (BRISK) detector, a fast retinal keypoint (FREAK) detector, a binary robust independent elementary features (BRIEF) detector, a features from accelerated segment test (FAST) detector, etc.

Furthermore, when there are multiple images of the one or more instances of the label, electronic device 110 may use the multiple images to correct an imaging error in the multiple images of the one or more instances of the label. For example, electronic device 110 may compare the multiple images to the instructions for the label to determine a change associated with operation of printer 130 over time. Notably, the change may include different printer noise in the instances of the label, which may occur in the background of a given instance of the label and/or in the information content of the given instance of the label. In the present discussion, 'printer noise' may be deviations from a constant background in an instance of a label or an image of an instance of a label, which is associated with a particular printer at a given instance in time when the instance of the label was printed. For example, printer noise in an instance of a label may be root-mean-square noise in a background (such as other than text or content) of the instance of the label. This correction may be applied to subsequent instances of the label that are printed by printer 130. In some embodiments, electronic device 110 provides information specifying the correction to computer system 122. Alternatively or additionally, the multiple images may be used to determine stereoscopic information, such as the distance between image sensor 132 and the instance of the label when the given image was acquired. The distance and/or a quality of image sensor 130 may be used to standardize or normalize printer noise in the images. As described further below with reference to FIGS. 6 and 7, the printer noise may be used in a predictive signature in a predictive model for a given subgroup of images.

As described further below with reference to FIGS. 6-7, after receiving the one or more images, the one or more timestamps or identifiers of the one or more images and/or the additional information, computer system 122 may use this information to train a predictive model. For example, computer 120-1 may divide the images into subgroups (or batches) based at least in part on the timestamps or the identifiers and/or differences between the images, and may train the predictive model using the subgroups and information specifying printer 130. For example, computer 120-1 may use a clustering technique (and, more generally, an unsupervised learning technique) to segment or divide the images into the subgroups. In some embodiments, the dividing of the images into subgroups may be based at least in part on differences in printer noise between the images.

Moreover, computer 120-1 may train the predictive model using a machine-learning technique (such as a supervised-learning technique, e.g., a classification and regression tree, a support vector machine or SVM, linear regression, non-linear regression, logistic regression, least absolute shrinkage and selection operator or lasso, ridge regression, a random forest, etc.) and based at least in part on the subgroups, the one or more images, the one or more timestamps or identifiers of the one or more images and/or the additional information. Note that the predictive model may have or may use a given image of a given instance of the label as an input, and may provide an identity or identifier of the given subgroup associated with the given image and the printer as an output. Furthermore, for a given subgroup, the predictive model may be associated with a predictive signature (such as a set of one or more features), and the predictive signatures for at least some of the subgroups may be different. For example, a quality of image sensor 132 and/or a distance between image sensor 132 and the instances of the label when the images were acquired may be used to standardize or normalize printer noise in the images (such as to a common quality and/or a standard magnification). The normalized printer noise may be included in the predictive signature for a given subgroup of images.

In some embodiments, the predictive model may include a neural network, such as a convolutional neural network or a recurrent neural network. Alternatively or additionally, in some embodiments, the predictive model includes multiple predictive models, where a given predictive model is associated with at least a given subgroup and at least a given predictive signature. For example, the given predictive signature may be associated with printer noise corresponding to printer 130.

While the predictive model may be able to uniquely identify the given subgroup associated with the given image, in other embodiments the predictive model may not be able to uniquely identity the given subgroup associated with the given image. Instead, the predictive model may be able to determine whether the given image is consistent (or not) with the one or more images (and, thus, with the determined subgroups). For example, the computer identify that the given image is associated with one of the subgroups, but does not uniquely identify the given subgroup.

Additionally, the predictive model may be based at least in part on information that specifies one or more conditions for which the instances of the label are valid. For example, the one or more conditions may include: one or more products, one or more product types, one or more attributes of the one or more products (such as a physical description or characteristic of a given product), one or more locations or regions where the instances of the label are valid (such as where the instances of the label are intended to be used), one or more time intervals during which the instances of the label are valid, and/or metadata associated with the one or more products.

Note that the predictive model may be used to activate and/or authenticate another instance of the label. For example, electronic device 110 may have printer 130 print the other instance of the label. Then, electronic device 110 may use image sensor 132 to acquire another image of the other instance of the label. Moreover, electronic device 110 may provide a request to activate the other instance of the label to computer 120-1. This request may include the other image of the other instance of label and a unique identifier that specifies another subgroup of images that includes the other image and/or printer 130 that generated the other instance of the label. Note that the other subgroup may be for images of instances of the label that have been printed and/or acquired in a preceding time interval, such as: 5 min, 10 min, 30 min, an hour, 6 hours, 12 hours, a day, a week or a month.

In response to the request to activate the other instance of the label, computer 120-1 may authenticate the other instance of the label using the predictive model, where the other instance of the label may be authenticated based at least in part on the other subgroup of the images, the unique identifier and/or the outputs of the predictive model. For example, computer 120-1 may compare the other subgroup of the images, the unique identifier and the outputs of the predictive model.

Moreover, computer 120-1 may selectively activate the other instance of the label based at least in part on the authentication. For example, the other instance of the label may be activated when the authentication indicates that the other instance of the label is valid. Notably, the other instance of the label may be valid when the other subgroup is that same as one of the subgroups, and when the unique identifier matches the unique identifier associated with the predictive model. Alternatively, the other instance of the label may be valid, even when the other subgroup is different from the subgroups, when computer 120-1 predict the other subgroup based at least in part on changes between or among the subgroups, and when the unique identifier matches the unique identifier associated with the predictive model.

Next, computer 120-1 may selectively provide information to electronic device 110 that indicates that the other instance of the label is activated based at least in part on the selective activation. Otherwise, computer 120-1 may provide to electronic device 110 information that indicates that the other instance of the label is not activated.

As described further below with reference to FIGS. 4-5, subsequently electronic device 112 (such as a point-of-sale terminal or cash register in a retail establishment, a scanner in a supply chain, etc.) may acquire an image of the other instance of the label. For example, electronic device 112 may include or may be coupled to an image sensor 134 (such as a CMOS or a CCD sensor). Notably, electronic device 112 may include or may be coupled to a camera or a scanner. Using image sensor 134, electronic device 110 may instruct image sensor 134 to capture an additional image of the other instance of the label.

Then, electronic device 112 may provide, to computer 120-1, the additional image and a unique identifier that specifies an additional subgroup of images that includes the image and/or a printer that generated the instance of the label (such as printer 130). For example, the unique identifier may be included in the instance of the label.

After receiving the additional image and the unique identifier, computer 120-1 may use the pretrained predictive model for the unique identifier to determine whether the additional image is associated with the additional subgroup of the images and printer 130. For example, the additional image may be input to the predictive model, and the output identifier of a subgroup and a printer may be compared to the information (such as the unique identifier of the additional subgroup and the printer) received from electronic device 112.

Moreover, the determination may be based at least in part on: a previous image of the additional instance of the label, a location associated with the previous image (such as the location where the previous image was acquired), a promotion in a region (such as a sale or discount, during a particular time interval, of a product that has the other instance of the label in the region), and/or a product launch (e.g., of the product) in the region or a second region. For example, a change between the previous image and the additional image may indicate fraud or that the other instance of the label is not valid or is not authentic. Alternatively or additionally, the other instance of the label may be associated with the product in a particular geographic region or during a particular time interval. Differences from the geographic region or the time interval, such as where or when the additional image was acquired, may indicate that the other instance of the label is not valid or is not authentic.

Consequently, computer 120-1 may extract information from the additional image, including: a location where the additional image was acquired, a time or a timestamp when the additional image was acquired, an environment where the additional image was acquired, a temperature when the additional image was acquired, a quality of an image sensor that acquired the additional image, and/or a distance between the image sensor and the additional instance of the label when the additional image was acquired. Alternatively or additionally, computer 120-1 may receive the extracted information from electronic device 112.

Computer 120-1 may use the extracted information to authenticate the other instance of the label. For example, computer 120-1 may compare the extracted information to stored information in memory. Alternatively or additionally, the other instance of the label is expected to be used in an environment having a temperature (or, more generally, an environmental condition, such as relative humidity) in a particular range of values (such as 60-85 F), deviations from the expected temperature (which may be indicated by a change in the other instance of the label, such as a change in the ink used to print the other instance of the label or a change in the printer noise) may indicate that the other instance of the label is not valid or is not authentic. In some embodiments, the quality of image sensor 134 and/or a distance between image sensor 134 and the other instance of the label when the additional image was acquired may be used, e.g., to normalize printer noise in the additional image, which is then used as an input to the predictive model. Thus, the determination may be based at least in part on the extracted information. For example, the determination may include: comparing the extracted information to stored information; and/or using the extracted information as an input to the predictive model.

When there is a match (e.g., when the additional image is associated with the information specifying the subgroup of the images and the printer output by the predictive model), computer 120-1 may selectively provide to electronic device 112 information confirming that the other instance of the label is authentic. Otherwise, computer 120-1 may perform a remedial action when the additional image is not associated with the information specifying the subgroup of the images and the printer output by the predictive model. For example, computer 120-1 may alert electronic device 112 that the other instance of the label is not valid or is not authentic. Alternatively or additionally, computer 120-1 may alert a manufacturer of a product that has the label and/or law enforcement that an invalid or non-authentic instance of the label has been identified.

While the preceding discussion illustrated the label-management technique being implemented via a cloud-based computer system 122, in other embodiments at least some of the aforementioned operations may be performed locally on, e.g., electronic device 110 or 112. For example, computer 120-1 may provide the predictive model to electronic device 110 or 112, which may then use the predictive model to authenticate subsequent instances of the label. Thus, operations in the label-management technique may be performed locally or remotely.

Moreover, while the preceding discussion illustrated the label-management technique using one or more images of an instance of the label and/or the unique identifier as inputs to the predictive model for a printer that generated the instance of the label, in other embodiments the predictive model may use information about a product associated with the instance of the label as an input to the predictive model. For example, a unique identifier of the product and/or an image of the product may be used as inputs to the predictive model. These inputs may be instead of or in addition to one or more previously described inputs to the predictive model.

Note that a given unique identifier in the preceding discussion may be compatible with one or more of: a global standards 1 (GS1) digital link, a global trade item number (GTIN), a serial shipping container (SSCC), a serialized global trade item number (SGTIN), an European article number code (EAN), a universal product codes (UPC), an electronic product code (EPC), a global location number (GLN), an international standard book identifier (ISBN), a global returnable assess identifier (GRAI), a global coupon number (GCN), an Amazon standard identification number (ASIN), a global returnable asset identifier (GRAD, a global shipment identification number (GSIN), a universally unique identifier (UUID), a global document type identifier (GDTY), a globally unique identifier (GUID), an Eddystone UID or EID, an international mobile equipment identity (IMEI), an eSIM identifier, a pharmaceutical product identifier (PhPID), a serial number, a blockchain address, a blockchain transaction idendtifier, a hash table, a blockchain token, an ERC721 token, a non-fungible token, or a public key. In some embodiments, a unique identifier may be generated randomly or pseudo-randomly.

In these ways, computer system 122 may allow instances of a label to be activated and/or authenticated. This capability may allow the instances of a label to be controlled. This may reduce or eliminate fraud or inadvertent duplication and, thus, may reduce the associated costs. Consequently, computer system 122 may enhance trust in the instances of the label and, therefore, in associated products.

We now describe embodiments of a method. FIG. 2 presents a flow diagram illustrating an example of a method 200 for providing images of instances of a label using an electronic device, such as electronic device 110 (FIG. 1). During operation, the electronic device may provide instructions (operation 210) for a label to a printer to print instances of a label. Then, the electronic device may acquire one or more images (operation 212) of one or more instances of the label using an image sensor, where a given image has a larger field of view than one that encompasses only the text or content in a given instance of the label. Next, the electronic device may provide, to a computer, the one or more images and one or more timestamps or identifiers (operation 214) of the one or more images.

In some embodiments, the electronic device may optionally perform one or more additional operations (operation 216). For example, the electronic device may acquire another image of another instance of the label. Then, the electronic device may provide, to the computer, the other image and a unique identifier that specifies another subgroup of images that includes the other image and the printer that generated the other instance of the label. Next, the electronic device may receive information from the computer that indicates whether the other instance of the label is authentic.

Note that the instructions for the label may be: received from another electronic device; accessed in memory; or generated by the electronic device. For example, the instructions for the label may be received from the other electronic device based at least in part on a request from the electronic device and a valid authentication of the request.

Moreover, the electronic device may include the printer and/or the image sensor.

Furthermore, when there are multiple images of the one or more instances of the label, the electronic device may use the multiple images to correct an imaging error in the multiple images of the one or more instances of the label.

Additionally, the electronic device may extract information from the other image, including: a location where the other image was acquired, a time or a timestamp when the other image was acquired, an environment where the other image was acquired, a temperature when the other image was acquired, a quality of the image sensor that acquired the other image, and/or a distance between the image sensor and the other instance of the label when the other image was acquired. The electronic device may provide the extracted information to the computer.

In some embodiments of method 200, there may be additional or fewer operations. Furthermore, the order of the operations may be changed, there may be different operations and/or two or more operations may be combined into a single operation.

Figure 3:
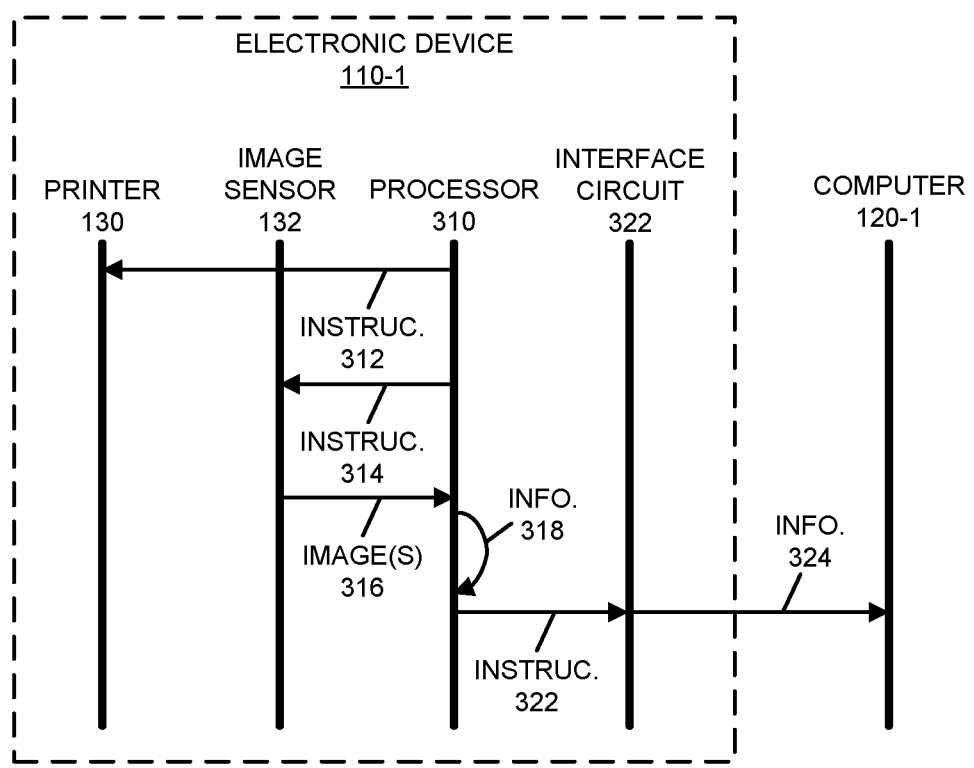
FIG. 3 is a drawing illustrating an example of communication among electronic devices in FIG. 1 in accordance with an embodiment of the present disclosure.

FIG. 3 presents a drawing illustrating an example of communication among electronic device 110 and computer 120-1. During the label-management technique, processor 310 in electronic device 110 may provide instructions 312 for a label to a printer 130 in or associated with electronic device 110 to print instances of a label. Then, processor 310 in electronic device 110 may instruct 314 image sensor 132 in or associated with electronic device 110 to acquire or capture one or more images 316 of one or more instances of the label. Next, processor 310 may optionally extract information 318 from the one or more images 316. Moreover, processor 310 may instruct 320 interface circuit 322 in electronic device 110 to provide information 324 to computer 120-1. For example, information 324 may include: the one or more images 316, one or more timestamps or identifiers of the one or more images 316, and/or information 318. As described further below with reference to FIGS. 6-7, computer 120-1 may use information 324 to train a predictive model for the instances of the label and/or one or more associated product(s).

While FIG. 3 illustrates communication between components using unidirectional or bidirectional communication with lines having single arrows or double arrows, in general the communication in a given operation in these figures may involve unidirectional or bidirectional communication.

Figure 4:
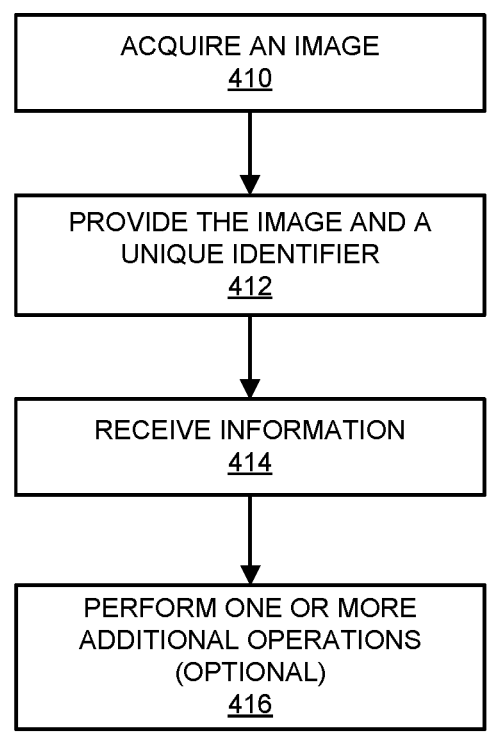
FIG. 4 is a flow diagram illustrating an example of a method for authenticating an instance of a label using an electronic device of FIG. 1 in accordance with an embodiment of the present disclosure.

FIG. 4 presents a flow diagram illustrating an example of a method 400 for authenticating an instance of a label using an electronic device, such as electronic device 112 (FIG. 1). During operation, the electronic device may acquire an image (operation 410) of an instance of a label. Then, the electronic device may provide, to a computer, the image and a unique identifier (operation 412) that specifies a subgroup of images that includes the image and a printer that generated the instance of the label. Next, the electronic device may receive information (operation 414) from the computer that indicates whether the instance of the label is authentic.

In some embodiments, the electronic device may optionally perform one or more additional operations (operation 416). For example, the electronic device may extract information from the image, including: a location where the image was acquired, a time or a timestamp when the image was acquired, an environment where the image was acquired, a temperature when the image was acquired, a quality of an image sensor that acquired the image, and/or a distance between the image sensor and the instance of the label when the image was acquired. The electronic device may provide the extracted information to the computer.

In some embodiments of method 400, there may be additional or fewer operations. Furthermore, the order of the operations may be changed, there may be different operations and/or two or more operations may be combined into a single operation.

Figure 5:
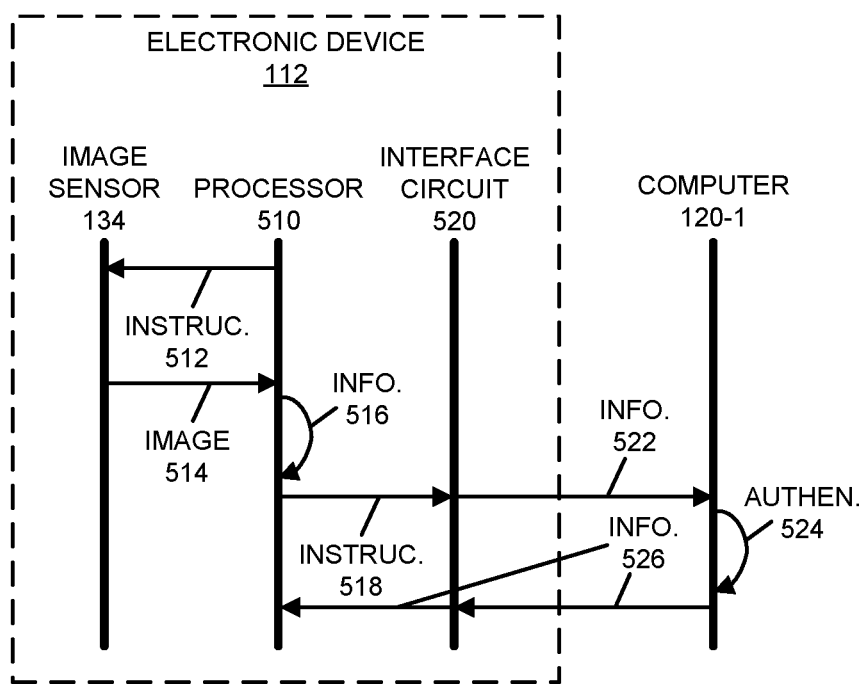
FIG. 5 is a drawing illustrating an example of communication among electronic devices in FIG. 1 in accordance with an embodiment of the present disclosure.

FIG. 5 presents a drawing illustrating an example of communication among electronic device 112 and computer 120-1. During the label-management technique, processor 510 in electronic device 112 may instruct 512 image sensor 134 in or associated with electronic device 112 to acquire an image 514 of an instance of a label. Then, processor 510 may optionally extract information 516 from image 514. Moreover, processor 510 may instruct 518 interface circuit 520 in electronic device 112 to provide information 522 to computer 120-1. For example, information 522 may include: image 514, a unique identifier that specifies a subgroup of images that includes image 514 and a printer that generated the instance of the label, and/or information 522.

Next, computer 120-1 may authenticate 524 the instance of the label using a pretrained predictive model for or associated with the printer. Furthermore, computer 120-1 may then provide information 526 that indicates whether the instance of the label is authentic to electronic device 112.

After receiving information 526, interface circuit 520 may provide information 526 to processor 510. When information 526 indicates that the instance of the label is authentic, processor 510 may, e.g., allow a transaction (such as purchase of a product) associated with the instance of the label to proceed or may allow a product associated with the instance of the label to continue in a supply chain or inventory. Alternatively, when information 526 indicates that the instance of the label is not authentic, processor 510 may perform a remedial action, such as cancelling the transaction or removing the product from the supply chain or inventory.

While FIG. 5 illustrates communication between components using unidirectional or bidirectional communication with lines having single arrows or double arrows, in general the communication in a given operation in these figures may involve unidirectional or bidirectional communication.

Figure 6:
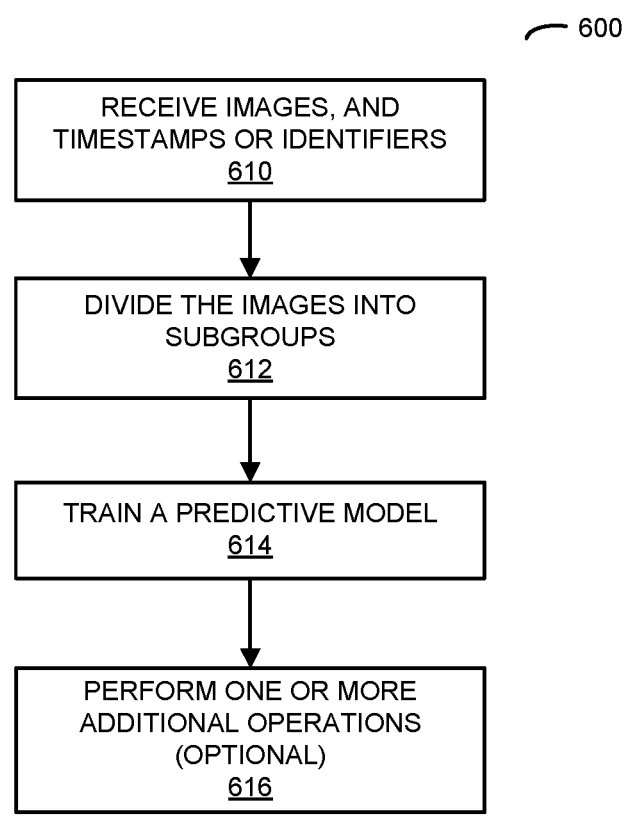
FIG. 6 is a flow diagram illustrating an example of a method for training a predictive model using a computer of FIG. 1 in accordance with an embodiment of the present disclosure.

FIG. 6 presents a flow diagram illustrating an example of a method 600 for training a predictive model using a computer, such as computer 120-1 (FIG. 1). During operation, the computer may receive, from an electronic device, multiple images of instances of a label and timestamps or identifiers of the images (operation 610), where the instances of the label are associated with a printer that generated the instances of the label. Then, the computer may divide the images into subgroups (operation 612) or batches based at least in part on the timestamps or the identifiers and/or differences between the images, and may train the predictive model (operation 614) using the subgroups and information specifying the printer. Note that, for a given subgroup, the predictive model may be associated with a predictive signature. Moreover, the predictive model may have or may use a given image of a given instance of the label as an input, and may provide an identity or an identifier of the given subgroup associated with the given image and the printer as an output.

In some embodiments, the computer may optionally perform one or more additional operations (operation 616). For example, the computer may receive, from the electronic device or a second electronic device, another image of another instance of the label and a unique identifier that specifies another subgroup of images that includes the other image and the printer that generated the other instance of the label. Using the unique identifier and the pretrained predictive model, the computer may determine whether the other image is associated with the other subgroup of the images and the printer. Next, the computer may selectively provide, to the electronic device or the second electronic device, information confirming that the other instance of the label is authentic when the other image is associated with the other subgroup of the images and the printer. Otherwise, the computer may perform a remedial action when the other image is not associated with the other subgroup of the images and the printer.

In some embodiments, the other subgroup may be one of the subgroups. Alternatively, the other subgroup may be different from the subgroups and the computer may predict the other subgroup based at least in part on changes between the subgroups (such as changes in the printer noise in the images).

Moreover, the determination may be based at least in part on: a previous image of the other instance of the label, a location associated with the previous image, a promotion in a region, and/or a product launch in a second region.

Note that the predictive signatures for at least some of the subgroups may be different.

Moreover, the predictive model may be trained using a machine-learning technique, such as a supervised-learning technique. In some embodiments, the predictive model may include a neural network.

Furthermore, in some embodiments, the predictive model includes multiple predictive models, where a given predictive model is associated with a given subgroup and a given predictive signature. For example, the given predictive signature may be associated with printer noise corresponding to the printer.

Additionally, the computer may not be able to uniquely identity the given subgroup associated with the given image. For example, the computer identify that the given image is associated with one of the subgroups, but does not uniquely identify the given subgroup.

Moreover, the label may be a product label.

In some embodiments, the computer may extract information from the other image, including: a location where the other image was acquired, a time or a timestamp when the other image was acquired, an environment where the other image was acquired, a temperature when the other image was acquired, a quality of an image sensor that acquired the other image, and/or a distance between the image sensor and the other instance of the label when the other image was acquired. Alternatively, the computer may receive the extracted information from the electronic device or the second electronic device. The computer may use the extracted information to authenticate the other instance of the label. For example, the computer may compare the extracted information to stored information in the memory. Moreover, the determination may be based at least in part on the extracted information. For example, the determination may include: comparing the extracted information to stored information; and/or using the extracted information as an input to the predictive model.

Furthermore, the computer may receive, from the electronic device or the second electronic device, a request to activate the other instance of the label, where the request may include the other image of the other instance of label and the unique identifier that specifies the other subgroup of images that includes the other image and the printer that generated the other instance of the label. Then, the computer may authenticate the other instance of the label using the predictive model, where the other instance of the label may be authenticated based at least in part on the other subgroup of the images, the unique identifier and the outputs of the predictive model. For example, the computer may compare the other subgroup of the images, the unique identifier and the outputs of the predictive model. Moreover, the computer may selectively activate the other instance of the label based at least in part on the authentication. Next, the computer may selectively provide, to the electronic device or the second electronic device, information that indicates that the other instance of the label is activated based at least in part on the selective activation. Otherwise, the computer may provide, to the electronic device or the second electronic device, information that indicates that the other instance of the label is not activated.

Additionally, the predictive model may be based at least in part on information that specifies one or more conditions for which the instances of the label are valid. For example, the one or more conditions may include: one or more products, one or more product types, one or more attributes of the one or more products, one or more locations or regions where the instances of the label are valid, one or more time intervals during which the instances of the label are valid, and/or metadata associated with the one or more products.

In some embodiments of method 600, there may be additional or fewer operations. Furthermore, the order of the operations may be changed, there may be different operations and/or two or more operations may be combined into a single operation.

Figure 7:
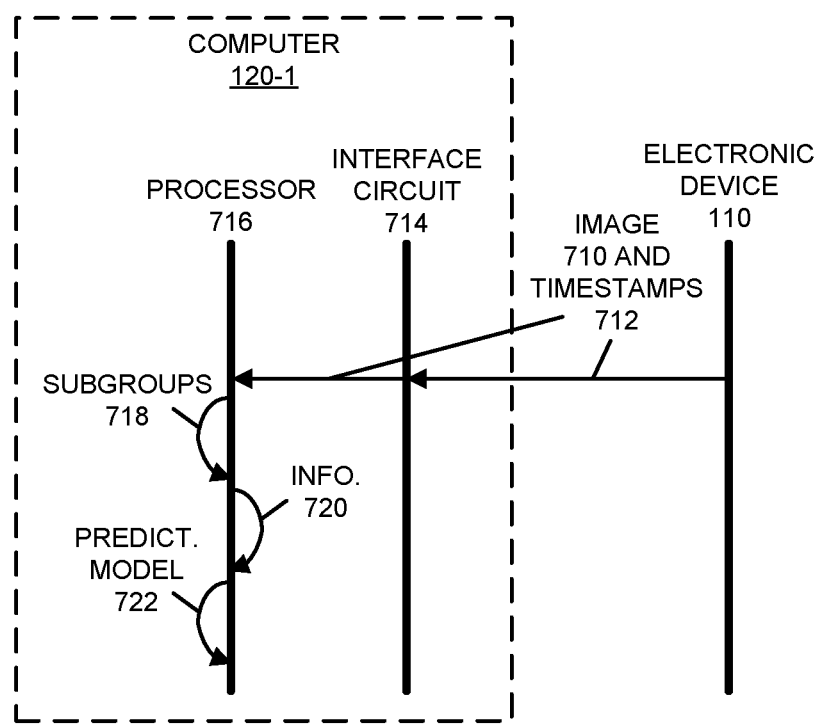
FIG. 7 is a drawing illustrating an example of communication among electronic devices in FIG. 1 in accordance with an embodiment of the present disclosure.

FIG. 7 presents a drawing illustrating an example of communication among electronic device 110 and computer 120-1. During the label-management technique, electronic device 110 may provide multiple images 710 of instances of a label and timestamps or identifiers 712 of images 710 to computer 120-1, where the instances of the label are associated with a printer that generated the instances of the label.

After receiving images 710 and the timestamps or identifiers 712, interface circuit 714 in computer 120-1 may provide images 710 and the timestamps or identifiers 712 to processor 716 in computer 120-1. Then, processor 716 may divide images 710 into subgroups 718 or batches based at least in part on the timestamps or identifiers 712 and/or differences between images 710. Moreover, processor 716 may optionally extract information 720 from images 710. Next, processor 716 may train a predictive model 722 using subgroups 718, information specifying the printer (which may have been received from electronic device 110), and/or extracted information 720.

As described previously, predictive model 722 may be used to activate and/or authenticate the instances of the label and/or additional instances of the label that are printed or generated by the printer.

While FIG. 7 illustrates communication between components using unidirectional or bidirectional communication with lines having single arrows or double arrows, in general the communication in a given operation in these figures may involve unidirectional or bidirectional communication.

We now further describe embodiments of the label-management technique. Product authentication is often challenging because people are clever in finding ways to circumvent authentication software and/or hardware. For example, the factory that prints labels (or instances of a label) for one or more products may be used after hours, thereby circumventing security systems to create unauthorized products that appear to be labeled or disguised as authorized originals.

Existing approaches to these problems include adding an on-label protection mechanism. For example, an on-label protection mechanism may include technology, such as: an ASIC and/or a radio-based smart label or tag. However, these approaches are often expensive and, therefore, may be difficult to scale into mass production. In addition, many of these approaches result in false positives, in which a fake product is inadvertently identified as an original.

In order to address the aforementioned problems, in the label-management technique, a computer system (such as computer system 122 in FIG. 1) may train a printer-specific predictive model that is used to activate and/or authenticate instances of a label and/or different labels. Notably, printers, such as a laser printer, may use an electrostatic digital printing process. For example, a laser printer may pass a laser beam back and forth over a negatively charged drum to create high-quality text and graphics. While laser printers can provide high-speed, high-resolution and wide-field imaging, there often result in background imaging noise (which is sometimes referred to as 'printer noise'). In addition to degrading the image quality, this printer noise may adversely affect scanning and authentication of digital codes (e.g., QR codes, barcodes, etc.).

In digital codes with a few repeating patterns, small amounts of random printer noise may result in changes in pixel values. While these changes are typically minimal, they can be tracked and traced back to or associated with a specific printer. However, there are other originals of noise in the printing and scanning process, such as noise or fluctuations in electronics and/or in the digitization of the codes.

Figure 8:
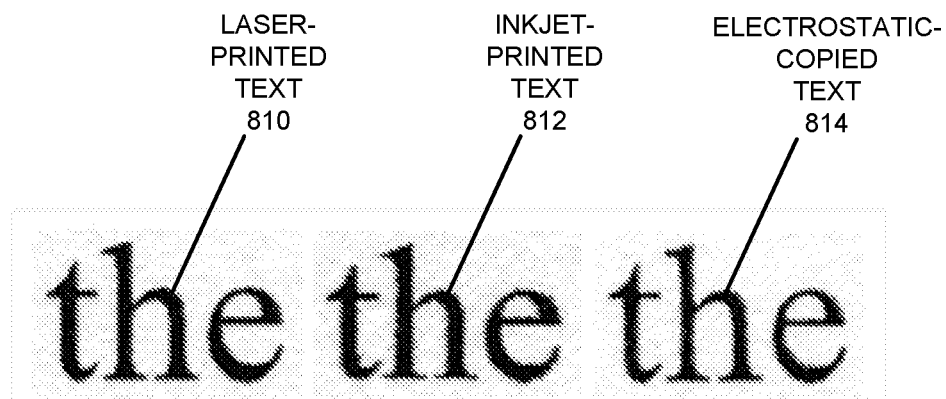
FIG. 8 is a drawing illustrating examples of instances of images of a label in accordance with an embodiment of the present disclosure.

FIG. 8 presents a drawing illustrating examples of instances of images of a label, including laser-printed text 810, inkjet-printed text 812 and electrostatic-copied text 814. In laser-printed text 810, there is a relatively noticeable amount of background printer noise outside the text-portion of the image. Moreover, while inkjet-printed text 812 has significantly more printer noise, in both cases there is printer noise that can be identified. Notably, there is printer noise energy in the text region and in the edge region, both which may contribute to the overall appearance of unwanted ink or printer noise in an image of an instance of a label.

Note that there are image-processing techniques that can be used to reduce or eliminate the influence of the background printer noise. For example, the background region may be removed or ignored, so that only the text remains. Alternatively, digital codes may be vectorized with exact pixel values and the digital-code contours in order to create or determine a template as to what it should look when there is no printer noise in an image. While this discussion is focused on printer noise in characters, note that there can also be printer noise in other types of digital codes (e.g., in barcodes, QR codes, etc.).

In the label-management technique, information associated with several components or electronic devices may be used. Notably, a connected label-generating printer may print labels or instances of a label (which are used interchangeably in the present discussion). For example, the printer may be a high-speed industrial printer that is used to print labels or instances of a label. The labels may be received as images from an external or a cloud-based computer or server. However, in some embodiments, the labels may be generated internally for the printer.

Moreover, a high-resolution scanner or image sensor may acquire images of the labels after the labels have been printed. The scanner/image sensor may take one or more images per label at a high speed. The image may be taken of a larger area or field of view than one that encompasses only the text or content in the label. In some embodiments, multiple images may be used to reduce scanning-induced errors or noise (e.g., by averaging the multiple images to reduce the scanner-induced noise). The scanner may send these images to a cloud-based computer or server along with a timestamp and an identifier of the printer.

Furthermore, the cloud-based computer may divide the images into small batches that are used to train a predictive model (such as a machine-learning model) to uniquely identify the batch. This identification may be to a high degree of accuracy (or, in other embodiments, to a lesser degree of accuracy). The trained predictive model may be labeled as a 'printer variable signature' (pVS). The pVS may change or vary between batches and printers. Consequently, the cloud-based computer may provide a set of labels that are uniquely identified and that are associated with a specific printer and a specific batch (e.g., at a particular time) and correlated to or associated with a specific pVS.

During label authentication, a label may be scanned and translated into a unique identification code or identifier. Based at least in part on the unique identification code or identifier, the cloud-based computer may identify the printer and the batch that this label belonged to, and may retrieve the pVS. Moreover, an image of the label may be input to the pVS, which may determine the correct or approximate printer/batch signature and may respond accordingly.

In some embodiments, information may be extracted from a scanned image (e.g., in real time), including: location, time, environmental sensing (such as based at least in part on sound), temperature, a quality of the scanner, a distance between scanner and the label, etc. The cloud-based computer may compare this information with internal records prior image scanning, and may make a decision using a separate machine-learning model from the predictive model (such as a classifier) to identify false labels based at least in part on one or more of these inputs. Consequently, the combination of the predictive model and the machine-learning model may provide a highly accurate authentication solution.

As noted previously, the connected labeling printer may be a production labeling printer, which may receive the labels from a cloud-based computer. In general, randomness or unpredictability may be inherent in the label-printing process because of mechanical, electro-mechanical, chemical/ink consistency and environmental impacts on the functional execution of various printers. This randomness may result in inconsistencies in the label generated by a printer.

Note that, in some embodiments, additional randomness in the labels may be optionally generated by the cloud-based computer. This generated or intentional randomness may provide, e.g., minor changes in distributed pixels that may not be detected by casual observation and may not be picked up by scanners.

As described further below, the inconsistencies/anomalies in instances of a label may create or provide a pVS for a printer.

Figure 9:
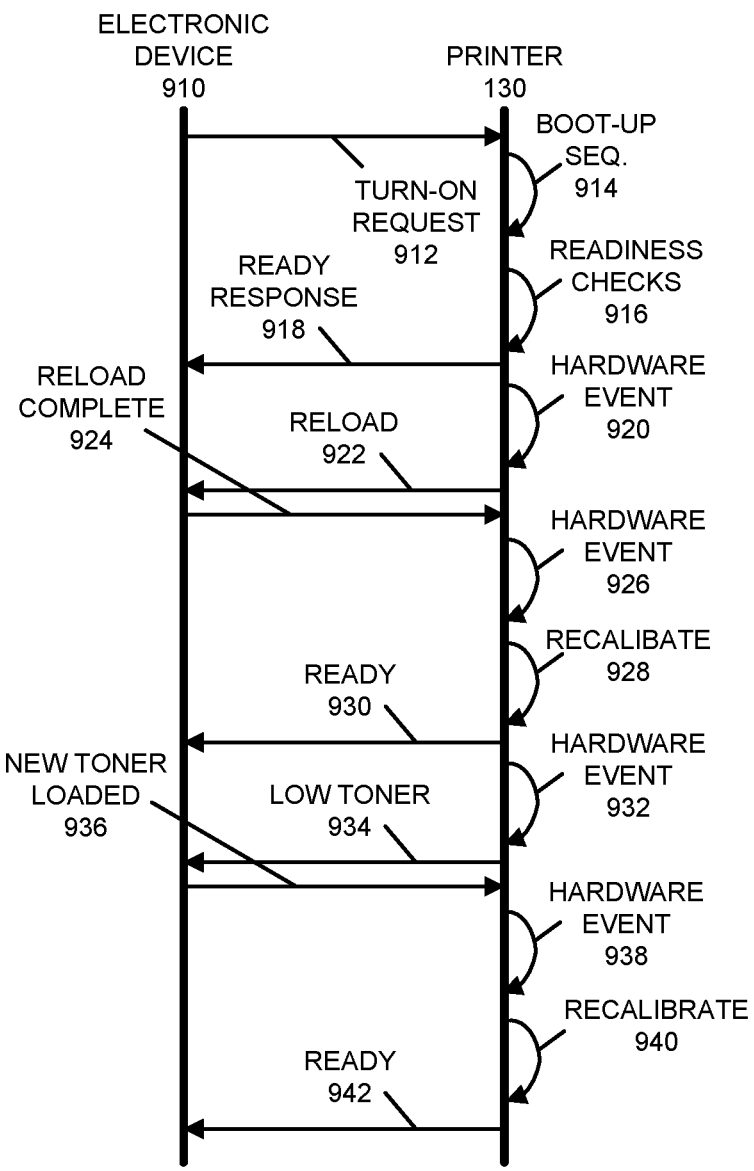
FIG. 9 is a drawing illustrating an example of operation of a printer in accordance with an embodiment of the present disclosure.

FIG. 9 presents a drawing illustrating an example of operation of printer 130, which can lead or result in randomness. Notably, an operator may, via an electronic device 910 that is associated with or used by the operator, provide a turn-on request 912 to printer 130. In response, printer 130 may turn on, and may execute a bootup sequence 914 (including a hardware calibration). Then, printer 130 may perform readiness checks 916, and may provide a ready response 918 to electronic device 910.

Next, there may be a hardware event 920 in printer 130, which may lead printer 130 to request, via electronic device 910, that the operator perform a reload 922 operation. After the reload is complete 924, there may be another hardware event 926 in printer 130. In response, printer 130 may recalibrate 928 and then may indicate to electronic device 910 that printer 130 is ready 930.

Moreover, another hardware event 932 in printer 130 may lead the printer to indicate to electronic device 910 that the toner is low (e.g., a low toner 934 message). In response, the operator may load a new toner cartridge and electronic device 910 may provide a new toner loaded 936 message.

Furthermore, yet another hardware event 938 in printer 130 may lead printer 130 to recalibrate 940. Then, printer 130 may indicate to electronic device 910 that it is ready 942.

Note that any of these hardware events may result in a change in the printer noise associated with printer 130.

Note that a high-resolution imaging system may take or acquire multiple images of every label and may store/upload the images to the cloud-based computer for analysis and learning. Moreover, the storage/upload may be continuous or as a batch of images after a time interval has elapsed. Furthermore, the resolution may be sufficient to capture random anomalies and minor defects in the images of the instances of the labels.

Additionally, machine learning (such as a supervised-learning technique) may be performed on the images (or information included in the images) to generate a pVS. This may allow distributed processing of label-image signatures.

Figure 10:
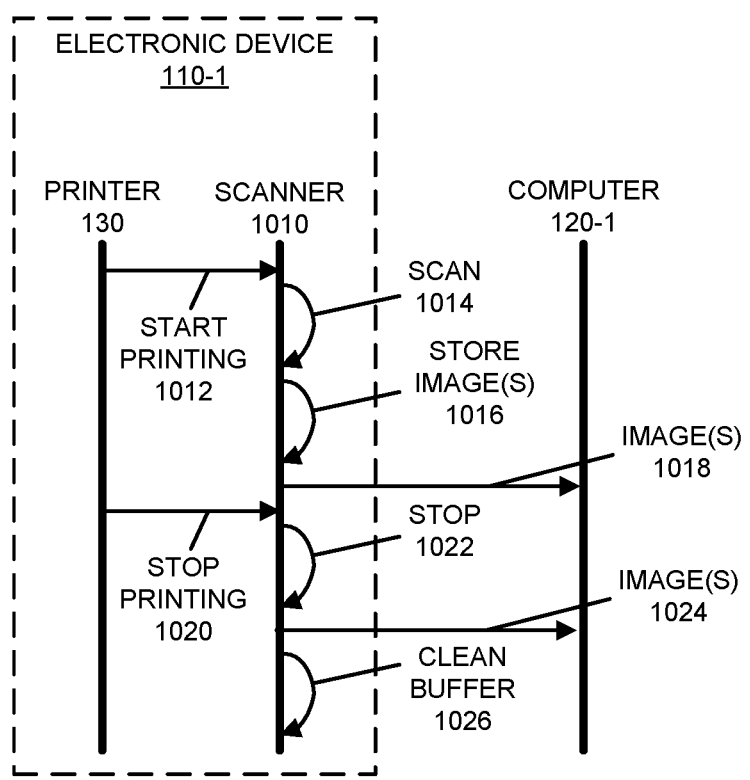
FIG. 10 is a drawing illustrating an example of communication among electronic devices in FIG. 1 in accordance with an embodiment of the present disclosure.

This is shown in FIG. 10, which presents a drawing illustrating an example of communication among electronic device 110 and computer 120-1 in computer system 122. Notably, during the label-management technique, printer 130 in or associated with electronic device 110 may start printing labels 1012. Then, scanner 1010 in or associated with electronic device 110 may perform a loop in which: labels are scanned 1014, image results are stored 1016, and images 1018 are uploaded to a cloud-based computer 120-1. When the printer stops printing labels 1020, the scanner may: stop 1022 performing the loop, remaining image(s) 1024 may be uploaded to the cloud-based computer, and buffers 1026 may be cleaned.

A predictive model trained using machine learning may be used to learn to identify a printer based at least in part on a label, a time, a location, origination and/or other factors. In some embodiments, the printer may optionally order or request an identifier from the cloud-based computer. This identifier may be used in subsequent communication from the printer to the cloud-based computer.

Note that a given image of a label from a printer may be labeled or tagged with the origination time. Because printer noise can change over time (such as multiple times during a single day of operation), short time-based batches may be used to train the predictive model. Furthermore, a major shift or change in the input may be identified based at least in part on quality analysis of the input images. For example, when such a change or drift in the printed label quality occurs, a new batch of labels (and, thus, a new subgroup) may be determined.

Additionally, a given batch of labels may be used to train a given predictive mode, such that the given predictive model can accurately identify the corresponding batch or subgroup. This trained predictive model may be a pVS for this batch from the printer. Note that the batch may be identified by the start and end time of the batch and/or the set of label identifiers included in the batch.

In some embodiments, depending on the batch, a pVS may be trained continuously, periodically (such as after a time interval) or as needed (such as when a new batch is determined).

After the predictive model or pVS is trained, a label identifier may be associated with a printer, a batch and the predictive model or pVS. This may allow the pVS to be run on a label image for a given label identifier in order to determine whether the label is authentic.

Note that in some embodiments a label may be optionally associated with a specific product. For example, the association may be performed by specifying at least some of the product metadata and associating the label with this metadata.

Subsequently, when a label is scanned by a user, the following operations may be performed: a printer may be identified based at least in part on a label identifier (a given label or instance of a label may have a different label identifier from other labels or instances of the label), a batch and the predictive model. Then, an image of the label may be input to the predictive model for analysis. The results from this analysis may be input to a second machine-learning model (such as a classifier) to determine whether the label is authentic.

In some embodiments, two or more machine-learning systems may be used with independent inputs and learning faculties. A first machine-learning system may be a prediction system that learns normal versus suspicious client scanning activities. The second machine-learning system may, based at least in part on a 'printer signature', learn an arbitrary large number of label printers.

Moreover, the first machine-learning system may learn based at least in part on scanned items. With each scan, a number of user context parameters (such as the user location, type of electronic device, e.g., a type of cellular telephone, frequency of scans, etc.) may be combined together with a number of product parameters (such as an expected location, a frequency of item scans, geographical distance between scans of the same identity, etc.). Note that the scans may be performed by or via a native application, high-resolution scanning (or camera) or a Web application (e.g., Web scanning) that is capable of identifying an item using several labeling or tagging technologies (such as 1D or 2D barcodes, image recognition, watermarking, etc.). Then, the data may be fed into a neural network or a supervised-learning model to provide an assessment as to whether this is a normal or a suspicious scan.

Furthermore, the second machine-learning system may be based at least in part on the fact that high-speed printers have their own signatures (such as printer noise), which may include inaccuracies or shifts in print quality and accuracy that can be detected at a given resolution. The shifts may change over time depending on toner levels, paper/label line feeds, a toner cartridge, a paper ream, room temperature, humidity, and other environmental conditions. This can be used as a random signature that can be learned in order to identify a batch of labels.

Additionally, when a client scans a label, both of the machine-learning systems may be used. Notably, the computer may determine whether a particular label was activated. If not, the process may stop.

Otherwise, a label may be optionally associated with a specific product as well as with the printer signature. Then, the label metadata and one or more images of the label may be provided to the first and second machine-learning systems. Both of the machine-learning systems may need to approve in order for a label to be deemed valid or authentic.

Notably, the first machine-learning system may take the label information (including one or more environmental conditions during the scanning, a location, an electronic device identifier, sounds in the environment, past activities, etc.) in order to make its decisions. Moreover, the second machine-learning system may be dynamic and may be based at least in part on the label identifier. The second machine-learning system may: identify a printer batch that a label belongs to; and may respond with yes or no as to whether the label is valid or authentic.

In some embodiments, a label or an instance of a label may be activated at a factory. For example, products may be labelled or tagged at item level (such as using a serial URI, URL or identifier). Then, the products may be activated in the factory by scanning the product identity (e.g., a serial URI or URL) and sending a record of the activation to a cloud-based computer or service. Subsequently, when scanned by consumers or brand agents, the identity may reveal (via the serial URI or URL) if the product has been activated or not. This approach may significantly reduce or eliminate the risk of backdoor goods being created at the factory.

Note that the learning in the label-management technique may be stopped or interrupted when duplicate or unauthorized label printing commenced. By stopping the learning, it may be less likely that the unauthorized labels will be recognized as valid. For example, local time may be received from the printer/scanner. Consequently, the computer may know what are working hours and what are off-working hours and, thus, what printing is authorized.

In some embodiments, the network connection to the cloud-based computer may be encrypted and may require handshake. Consequently, only legal or approved interfaces may be connected between the electronic device and the computer.

Alternatively or additionally, the labels may be provided by the cloud-based computer to the printer based at least in part on a request. Moreover, each request may be associated with valid authorization. Consequently, a client (such as a company) may have the ability to control when labels are provided.

Moreover, the learning process may only be activated within authorized printing times. Therefore, printing outside of the allowed times may be deemed to be unauthorized.

Furthermore, using an independent system to verify a product may provide stronger authentication and a higher probability of success.

Thus, the label-management technique may use two-factor authentication with multiple (two or more) independent machine-learning systems. Moreover, continuous and semi-continuous imaging after printing from a printer at the origination/source may allow learning per print batch, including the predictive signature associated with the batch of images. Furthermore, machine learning may be used to predict or identify duplicate or non-original labels that are scanned by a consumer.

In some embodiments, the predictive model or the second machine-learning model (such as a classifier) may use one or more inputs, including: a scan location, a number of scan repetitions, a last scan location, a user scan history (such as one or more previous product scans), known campaigns, local promotions and/or product launches in a new region.

Moreover, each batch may be or may result in a separate predictive model. Machine learning may be used to accurately (e.g., 90, 95 or 99% accuracy) identify the batch. However, in some embodiments, a lower accuracy (e.g., 50 or 75%) may be used. Note that the batch separation or segmentation may be based at least in part on time, label identifiers, changes in images, etc. In general, an image may include a label identifier or another unique identifier.

Furthermore, a labeling printer may order or request an identifier from a cloud-based computer. For example, the labeling printer may order an identifier for a unique identity.

Additionally, short-time-based batches may be used to train a machine-learning system in order to identify printer noise. The machine learning may identify a major shift in the input based at least in part on quality analysis of the input images. As changes are detected in the printed label quality, the computer may mark this as a new batch of labels.

A pVS may be learned continuously or semi-continuously (based at least in part on a batch). In some embodiments, a label may be optionally associated with specific product by specifying and associating the label with the product metadata.

Note that scanning of products/items may be via a native or Web-based application. The Web-based application may be capable of identifying an item using several labeling or tagging technologies, such as 1D or 2D barcodes, image recognition, watermarking, etc. Note that the scans may be high or low-resolution scans.

Moreover, the connection between the electronic device and the computer may be encrypted and may require a handshake, so that only legal interfaces are connected. Alternatively or additionally, a label may be received at a printer from the computer based at least in part on request, and each request may be validated/authorized by a client (such as a corporation or organization) that is controlling or managing the labels or the instances of the labels.

We now describe embodiments of an electronic device, which may perform at least some of the operations in the label-management technique. FIG. 11 presents a block diagram illustrating an example of an electronic device 1100 in accordance with some embodiments, such as electronic device 110, electronic device 112, access point 114, base station 116, one of computers 120, etc. This electronic device includes processing subsystem 1110, memory subsystem 1112, and networking subsystem 1114. Processing subsystem 1110 includes one or more devices configured to perform computational operations. For example, processing subsystem 1110 can include one or more microprocessors, ASICs, microcontrollers, programmable-logic devices, one or more graphics process units (GPUs) and/or one or more digital signal processors (DSPs).

Memory subsystem 1112 includes one or more devices for storing data and/or instructions for processing subsystem 1110 and networking subsystem 1114. For example, memory subsystem 1112 can include dynamic random access memory (DRAM), static random access memory (SRAM), and/or other types of memory. In some embodiments, instructions for processing subsystem 1110 in memory subsystem 1112 include: one or more program modules or sets of instructions (such as program instructions 1122 or operating system 1124), which may be executed by processing subsystem 1110. Note that the one or more computer programs may constitute a computer-program mechanism. Moreover, instructions in the various modules in memory subsystem 1112 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 1110.

In addition, memory subsystem 1112 can include mechanisms for controlling access to the memory. In some embodiments, memory subsystem 1112 includes a memory hierarchy that comprises one or more caches coupled to a memory in electronic device 1100. In some of these embodiments, one or more of the caches is located in processing subsystem 1110.

In some embodiments, memory subsystem 1112 is coupled to one or more high-capacity mass-storage devices (not shown). For example, memory subsystem 1112 can be coupled to a magnetic or optical drive, a solid-state drive, or another type of mass-storage device. In these embodiments, memory subsystem 1112 can be used by electronic device 1100 as fast-access storage for often-used data, while the mass-storage device is used to store less frequently used data.

Networking subsystem 1114 includes one or more devices configured to couple to and communicate on a wired and/or wireless network (i.e., to perform network operations), including: control logic 1116, an interface circuit 1118 and one or more antennas 1120 (or antenna elements) and/or input/output (I/O) port 1130. (While FIG. 11 includes one or more antennas 1120, in some embodiments electronic device 1100 includes one or more nodes, such as nodes 1108, e.g., a network node that can be coupled or connected to a network or link, or an antenna node or a pad that can be coupled to the one or more antennas 1120. Thus, electronic device 1100 may or may not include the one or more antennas 1120.) For example, networking subsystem 1114 can include a Bluetooth™ networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi® networking system), an Ethernet networking system, a cable modem networking system, and/or another networking system.

Networking subsystem 1114 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 1100 may use the mechanisms in networking subsystem 1114 for performing simple wireless communication between the electronic devices, e.g., transmitting advertising or beacon frames and/or scanning for advertising frames transmitted by other electronic devices as described previously.

Within electronic device 1100, processing subsystem 1110, memory subsystem 1112, and networking subsystem 1114 are coupled together using bus 1128. Bus 1128 may include an electrical, optical, and/or electro-optical connection that the subsystems can use to communicate commands and data among one another. Although only one bus 1128 is shown for clarity, different embodiments can include a different number or configuration of electrical, optical, and/or electro-optical connections among the subsystems.

In some embodiments, electronic device 1100 includes a display subsystem 1126 for displaying information on a display, which may include a display driver and the display, such as a liquid-crystal display, a multi-touch touchscreen, etc.

Electronic device 1100 can be (or can be included in) any electronic device with at least one network interface. For example, electronic device 1100 can be (or can be included in): a computer system (such as a cloud-based computer system or a distributed computer system), a desktop computer, a laptop computer, a subnotebook/netbook, a server, a tablet computer, a smartphone, a cellular telephone, a smartwatch, a consumer-electronic device, a portable computing device, an access point, a transceiver, a router, a switch, communication equipment, a computer network device, a stack of computer network devices, an access point, a controller, test equipment, a printer, and/or another electronic device.

Although specific components are used to describe electronic device 1100, in alternative embodiments, different components and/or subsystems may be present in electronic device 1100. For example, electronic device 1100 may include one or more additional processing subsystems, memory subsystems, networking subsystems, and/or display subsystems. Additionally, one or more of the subsystems may not be present in electronic device 1100. Moreover, in some embodiments, electronic device 1100 may include one or more additional subsystems that are not shown in FIG. 11, such as a user-interface subsystem 1132. Also, although separate subsystems are shown in FIG. 11, in some embodiments some or all of a given subsystem or component can be integrated into one or more of the other subsystems or component(s) in electronic device 1100. For example, in some embodiments program instructions 1122 are included in operating system 1124 and/or control logic 1116 is included in interface circuit 1118.

Moreover, the circuits and components in electronic device 1100 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 1114 (or, more generally, of electronic device 1100). The integrated circuit may include hardware and/or software mechanisms that are used for transmitting wireless signals from electronic device 1100 and receiving signals at electronic device 1100 from other electronic devices. Aside from the mechanisms herein described, radios are generally known in the art and hence are not described in detail. In general, networking subsystem 1114 and/or the integrated circuit can include any number of radios. Note that the radios in multiple-radio embodiments function in a similar way to the described single-radio embodiments.

In some embodiments, networking subsystem 1114 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used Ethernet, a cellular-telephone communication protocol and a Wi-Fi communication protocol as an illustrative example, in other embodiments a wide variety of communication protocols and, more generally, wired and/or wireless communication techniques may be used. Thus, the label-management technique may be used with a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the label-management technique may be implemented using program instructions 1122, operating system 1124 (such as a driver for interface circuit 1118) or in firmware in interface circuit 1118. Alternatively or additionally, at least some of the operations in the label-management technique may be implemented in a physical layer, such as hardware in interface circuit 1118.

In the preceding description, we refer to 'some embodiments.' Note that 'some embodiments' describes a subset of all of the possible embodiments, but does not always specify the same subset of embodiments. Moreover, note that numerical values in the preceding embodiments are illustrative examples of some embodiments. In other embodiments of the label-management technique, different numerical values may be used.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer, comprising:
    an interface circuit configured to communicate with an electronic device:
    a processor; and
    memory configured to store program instructions, wherein, when executed by the processor, the program instructions cause the computer to perform operations comprising:
        receiving, at the interface circuit and associated with the electronic device, multiple images of instances of a label and timestamps or identifiers of the multiple images, wherein the instances of the label are associated with a printer that generated the instances of the label:
        dividing the multiple images into subgroups based at least in part on the timestamps or the identifiers, differences between the multiple images, or both; and
        training a predictive model using the subgroups and information specifying the printer, wherein, for a given subgroup, the predictive model is associated with a predictive signature, and
        wherein the predictive model has a given image of a given instance of the label as an input, and provides an identity or an identifier of the given subgroup associated with the given image and the printer as an output.

2. The computer of claim 1, wherein the operations comprise:
    receiving, at the interface circuit and associated with the electronic device or a second electronic device, another image of another instance of the label and a unique identifier that specifies another subgroup of images that includes the another image and the printer that generated the another instance of the label:
    determining, using the unique identifier and the predictive model, whether the another image is associated with the another subgroup of images and the printer:
    selectively providing, from the interface circuit and addressed to the electronic device or the second electronic device, information confirming that the another instance of the label is authentic when the another image is associated with the another subgroup of images and the printer; and
    performing a remedial action when the another image is not associated with the another subgroup of images and the printer.

3. The computer of claim 2, wherein the another subgroup is one of the subgroups.

4. The computer of claim 2, wherein the another subgroup is different from the subgroups and the operations comprise predicting the another subgroup based at least in part on changes between the subgroups.

5. The computer of claim 2, wherein the operations comprise extracting, from the another image, information comprising one or more of: a location where the another image was acquired, a time when the another image was acquired, an environment where the another image was acquired, a temperature when the another image was acquired, a quality of an image sensor that acquired the another image, or a distance between the image sensor and the another instance of the label when the another image was acquired, in which said extracting yields extracted information; and
    wherein the determining is based at least in part on the extracted information.

6. The computer of claim 5, wherein the determining comprises at least one of: comparing the extracted information to stored information: or using the extracted information as an input to the predictive model.

7. The computer of claim 2, wherein the operations comprise receiving, at the interface circuit and associated with the electronic device or the second electronic device, information comprising one or more of: a location where the another image was acquired, a time when the another image was acquired, an environment where the another image was acquired, a temperature when the another image was acquired, a quality of an image sensor that acquired the another image, or a distance between the image sensor and the another instance of the label when the another image was acquired, in which said receiving yields received information; and wherein the determining is based at least in part on the received information.

8. The computer of claim 7, wherein the determining comprises at least one of: comparing the received information to stored information: or using the received information as an input to the predictive model.

9. The computer of claim 2, wherein the determining is based at least in part on one or more of: a previous image of the another instance of the label, a location associated with the previous image, a promotion in a region, or a product launch in a second region.

10. The computer of claim 1, wherein predictive signatures for at least some of the subgroups are different.

11. The computer of claim 1, wherein the predictive model comprises multiple predictive models; and and wherein a given predictive model is associated with a given subgroup and a given predictive signature.

12. The computer of claim 11, wherein the given predictive signature is associated with printer noise corresponding to the printer.

13. The computer of claim 1, wherein the computer is configured to identify that the given image is associated with one of the subgroups, but does not uniquely identify the given subgroup associated with the given image.

14. The computer of claim 1, wherein the operations comprise:

receiving, at the interface circuit and associated with a second electronic device, a request to activate another instance of the label, wherein the request comprises another image of the another instance of label and a unique identifier that specifies another subgroup of images that includes the another image and the printer that generated the another instance of the label:

authenticating the another instance of the label using the predictive model, wherein the another instance of the label is authenticated based at least in part on the another subgroup of the images, the unique identifier and the outputs of the predictive model:

selectively activating the another instance of the label based at least in part on the authentication, said selecting activating yielding a selective activation:

selectively providing, to the interface circuit and addressed to the second electronic device, information that indicates that the another instance of the label is activated based at least in part on the selective activation; and otherwise providing, to the interface circuit and addressed to the second electronic device, information that indicates that the another instance of the label is not activated.

15. The computer of claim 1, wherein the predictive model is based at least in part on information that specifies one or more conditions for which the instances of the label are valid; and wherein the one or more conditions comprise one or more of: one or more products, one or more product types, one or more attributes of the one or more products, one or more locations or regions where the instances of the label are valid, one or more time intervals during which the instances of the label are valid, or metadata associated with the one or more products.

16. The computer of claim 1, wherein the instances of the label comprise product labels.

17. The computer of claim 1, wherein the operations comprise providing, from the interface circuit, information addressed to the electronic device that indicates that the label is activated.

18. The computer of claim 17, wherein the label is factory activated.

19. A non-transitory computer-readable storage medium for use in conjunction with a computer, the non-transitory computer-readable storage medium storing program instructions that, when executed by the computer, cause the computer to perform operations comprising:

receiving, at an interface circuit and associated with an electronic device, multiple images of instances of a label and timestamps or identifiers of the multiple images, wherein the instances of the label are associated with a printer that generated the instances of the label:

dividing the multiple images into subgroups based at least in part on the timestamps or the identifiers, differences between the multiple images, or both; and training a predictive model using the subgroups and information specifying the printer, wherein, for a given subgroup, the predictive model is associated with a predictive signature, and wherein the predictive model has a given image of a given instance of the label as an input, and provides an identity or an identifier of the given subgroup associated with the given image and the printer as an output.

20. A method of training a predictive model, comprising: by a computer:

receiving, at an interface circuit and associated with an electronic device, multiple images of instances of a label and timestamps or identifiers of the multiple images, wherein the instances of the label are associated with a printer that generated the instances of the label:

dividing the multiple images into subgroups based at least in part on the timestamps or the identifiers, differences between the multiple images, or both; and training a predictive model using the subgroups and information specifying the printer, wherein, for a given subgroup, the predictive model is associated with a predictive signature, and wherein the predictive model has a given image of a given instance of the label as an input, and provides an identity or an identifier of the given subgroup associated with the given image and the printer as an output.

* * * * *